Aug. 2, 1938.　　　　F. MAGIDSON　　　　2,125,794
MACHINE FOR MAKING TAGS
Original Filed Feb. 16, 1934　　9 Sheets-Sheet 1
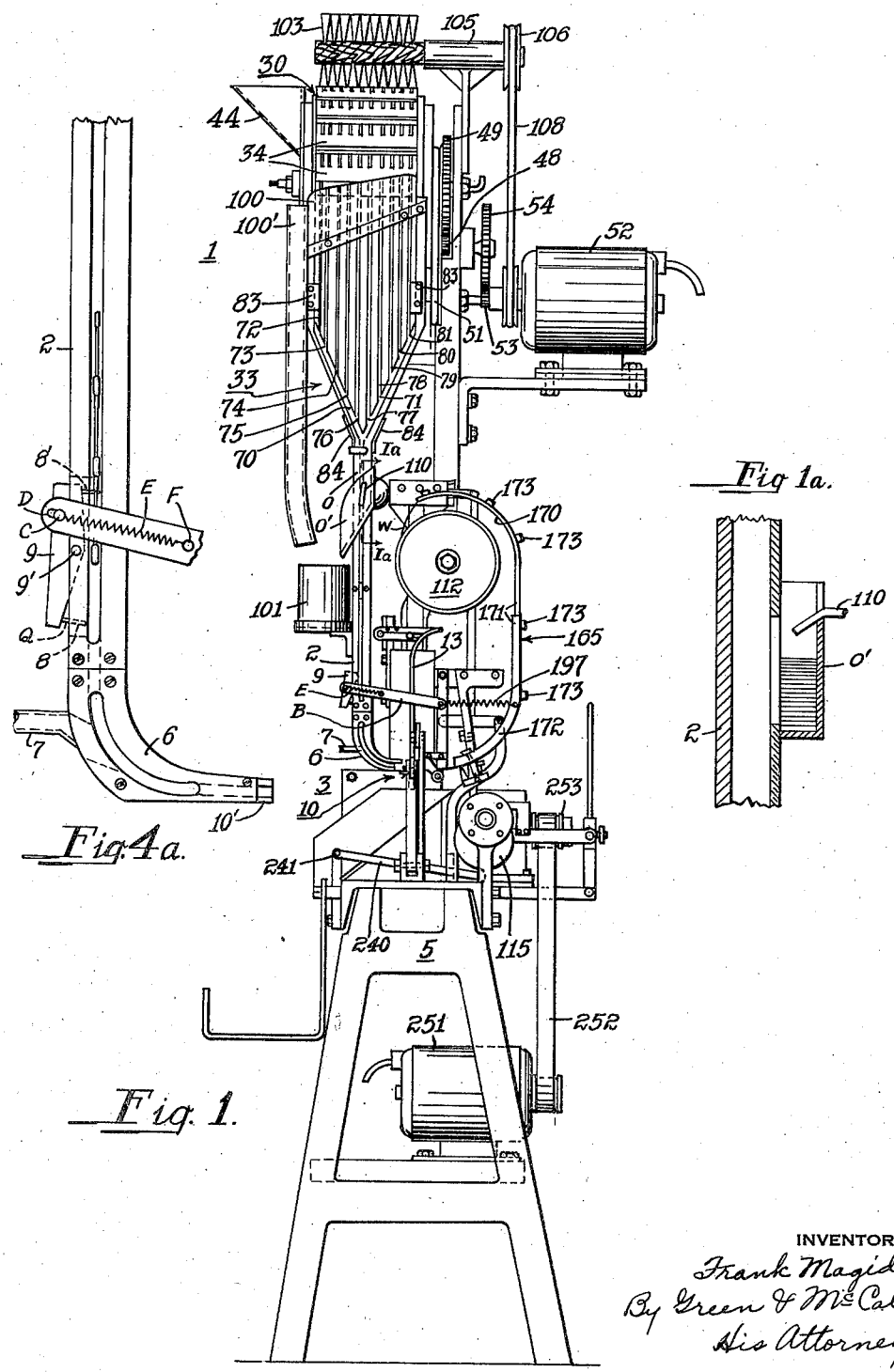
INVENTOR
Frank Magidson
By Green & McCallister
His Attorneys Aug. 2, 1938.   F. MAGIDSON   2,125,794
MACHINE FOR MAKING TAGS
Original Filed Feb. 16, 1934   9 Sheets-Sheet 2
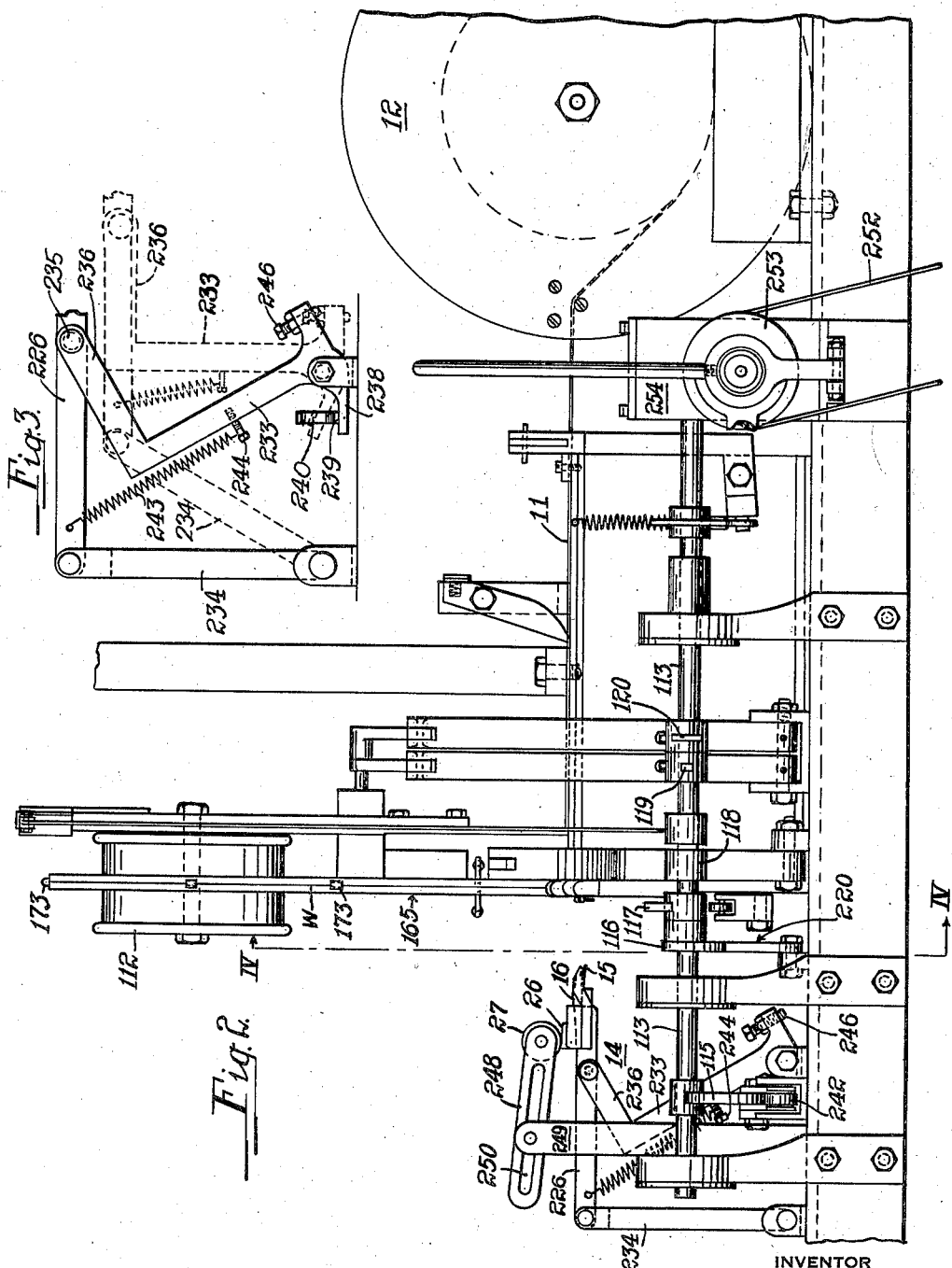
INVENTOR
Frank Magidson
By Green & McCallister
His Attorneys Aug. 2, 1938. F. MAGIDSON 2,125,794
MACHINE FOR MAKING TAGS
Original Filed Feb. 16, 1934 9 Sheets-Sheet 3

INVENTOR
Frank Magidson
By Green & McCallister
His Attorneys

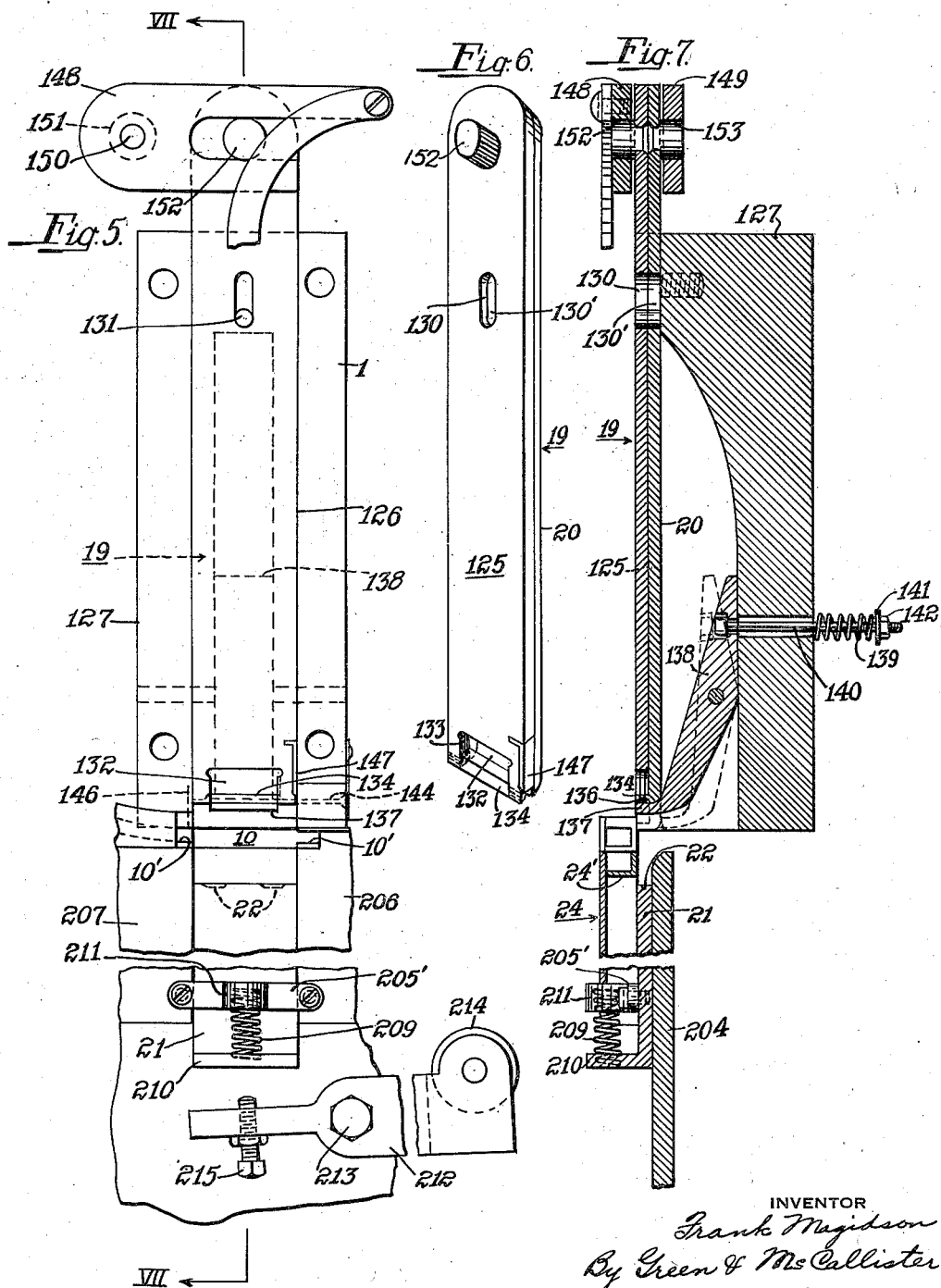

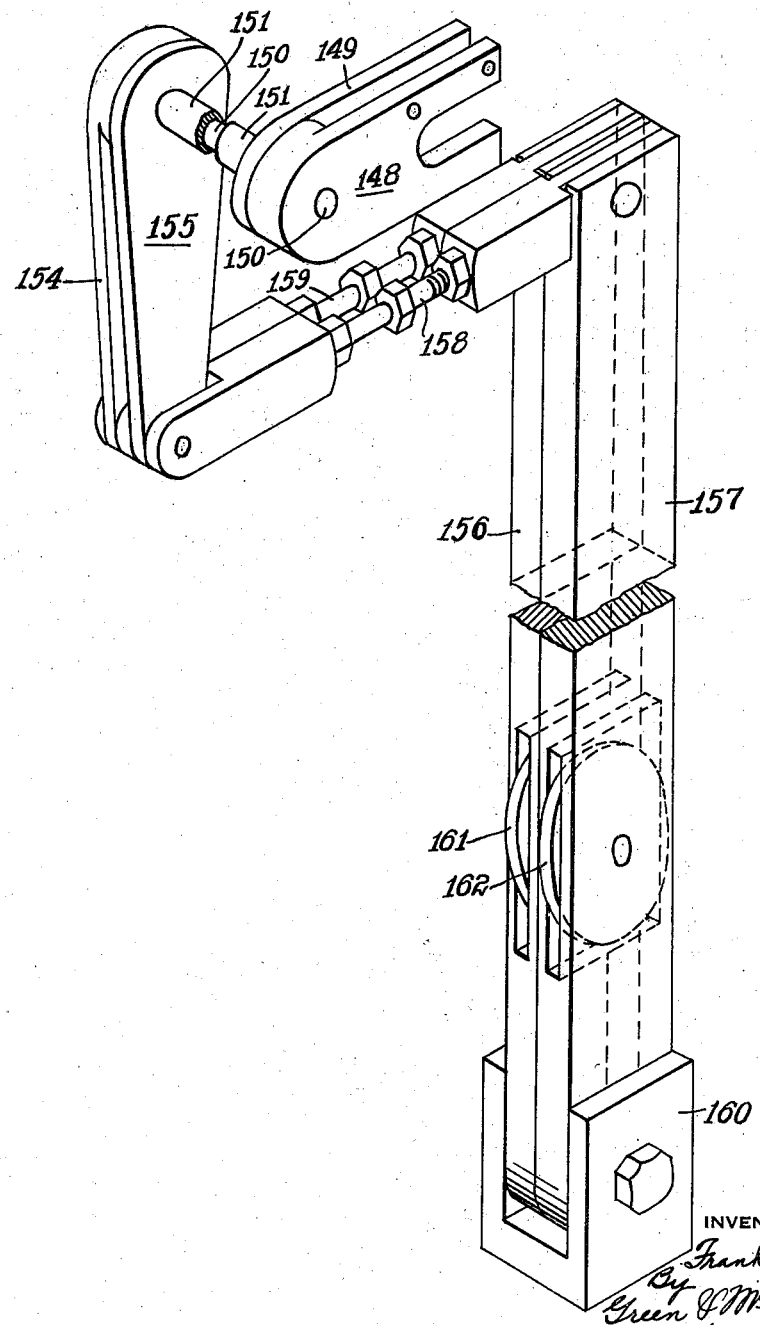

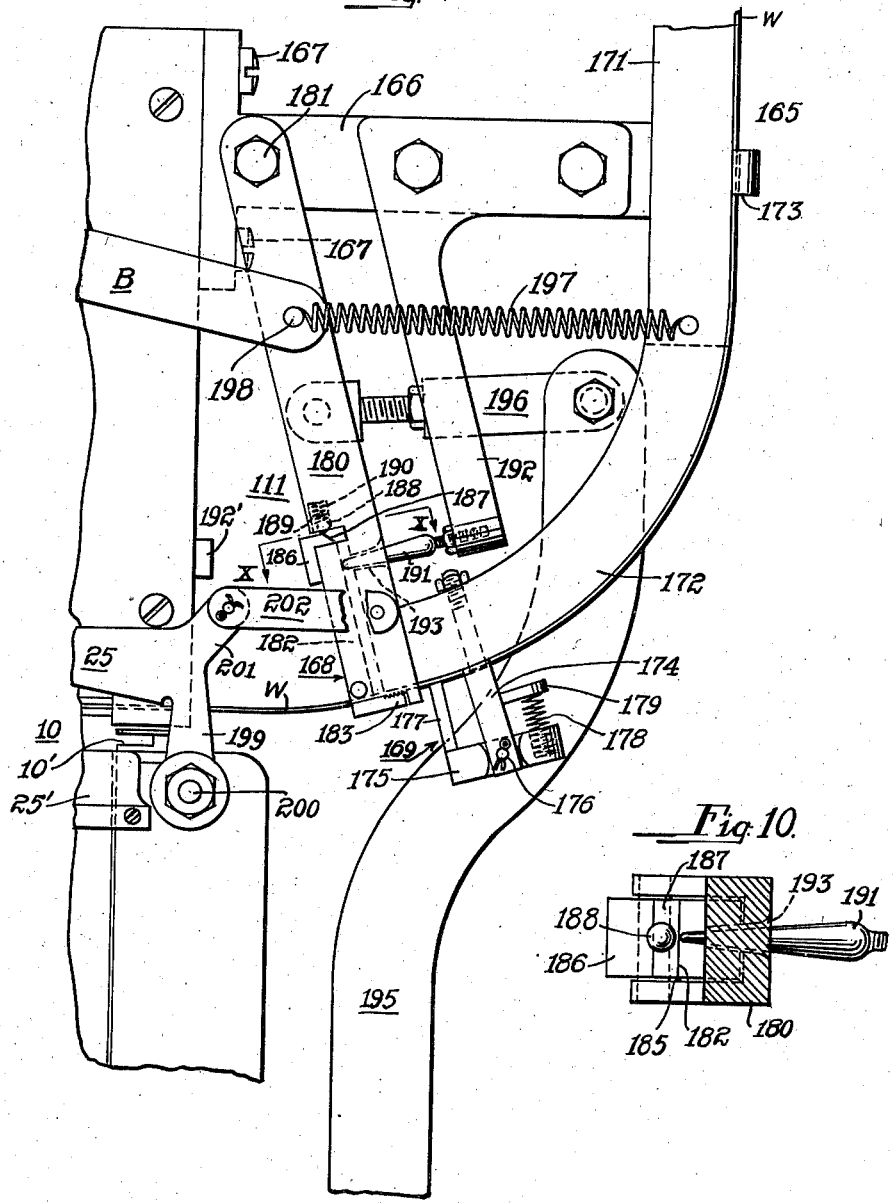

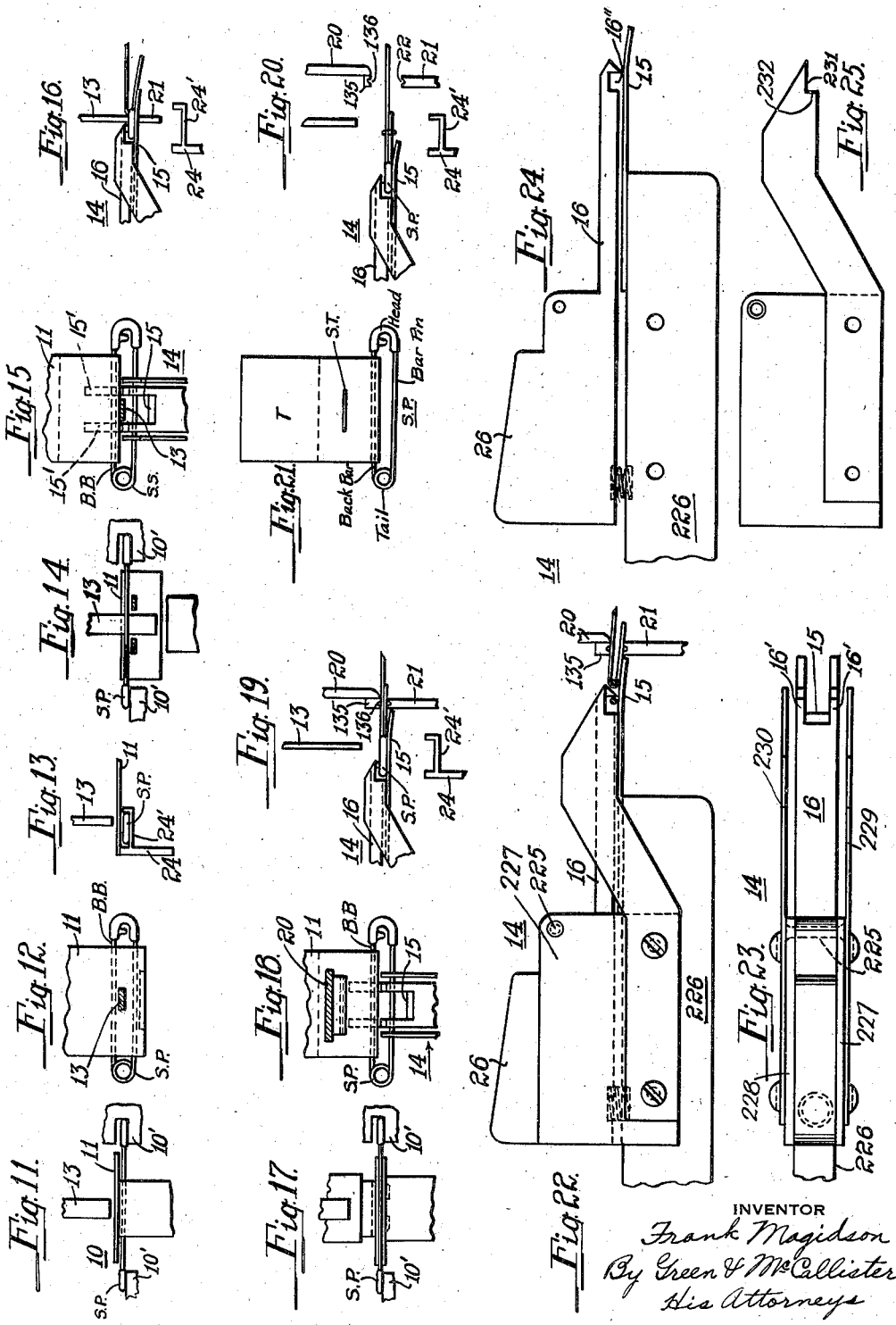

Aug. 2, 1938.　　　F. MAGIDSON　　　2,125,794
MACHINE FOR MAKING TAGS
Original Filed Feb. 16, 1934　　9 Sheets-Sheet 8

INVENTOR
Frank Magidson
By Green & McCallister
His Attorneys

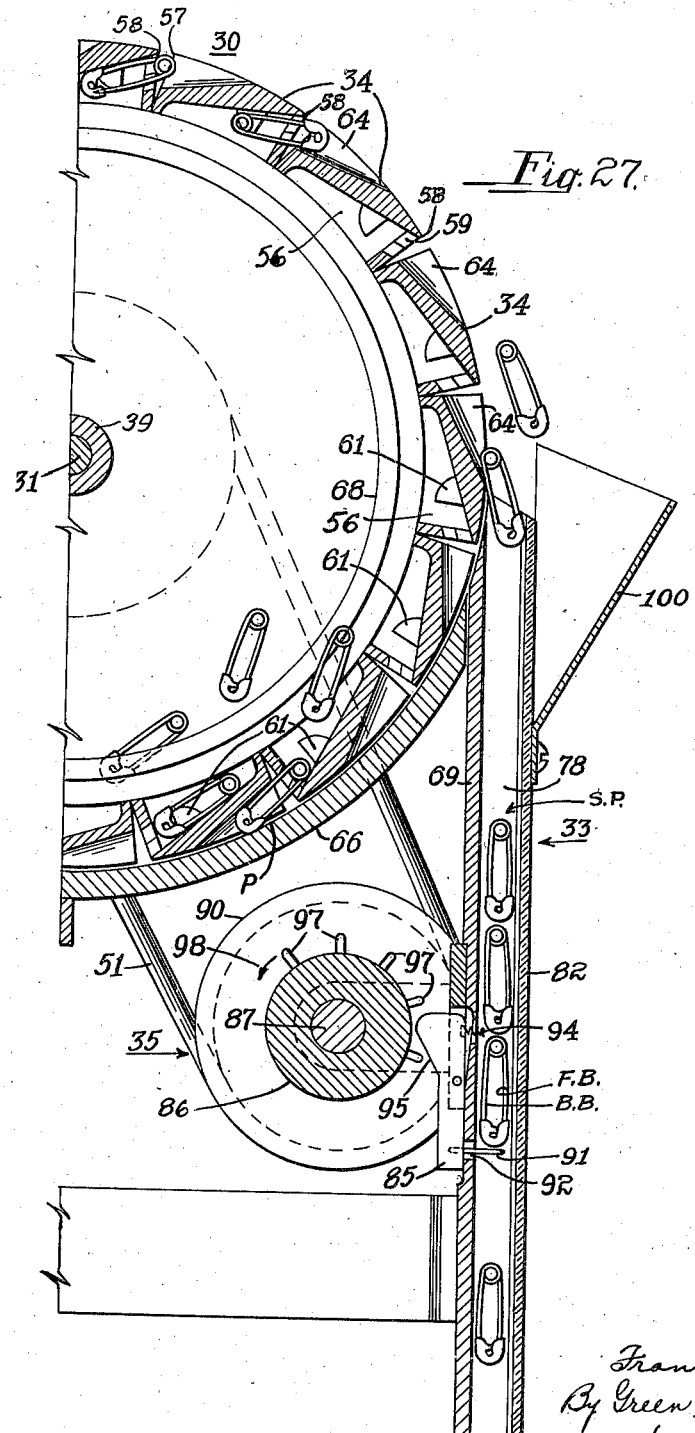

Patented Aug. 2, 1938

2,125,794

UNITED STATES PATENT OFFICE 2,125,794

MACHINE FOR MAKING TAGS

Frank Magidson, Pittsburgh, Pa., assignor to Pittsburgh Tag Company, a corporation of Pennsylvania Original application February 16, 1934, Serial No. 711,550. Divided and this application May 7, 1937, Serial No. 141,380

11 Claims. (Cl. 93—87)

This invention relates generally to automatic tag making machines and more specifically to machines for making tags comprising a safety pin and a tab of tag material secured to the pin. This application is a division of my application Serial No. 711,550, filed February 16, 1934, which matured into Letters Patent No. 2,083,534, of June 8, 1937.

An object of this invention is the provision of an automatic machine having mechanism for feeding pins and tab material in definite order and timed relationship, and securing the tab material to the pins.

Another object of the invention is the provision of an automatic machine having mechanism for feeding safety pins and tab material in definite order, sequence and timed relationship, securing a predetermined length of tab material to a bar of the pin, and then discharging the finished tag.

A further object of the invention is the provision of an automatic machine having mechanism for feeding safety pins, tab material, staple stock in predetermined order, sequence and time relationship to a tag forming station of the machine, folding a portion of the tag material around a bar of the pin, forming a staple, punching the staple through the folded material and clinching the same to secure the tab material to the pin, and then severing the tag from the tab stock and discharging the tag from the machine.

A further object of the invention is the provision of a stapling mechanism for a pin-tag making machine and a novel staple stock feeding mechanism therefor.

Other objects of the invention will, in part, be apparent and will, in part, be obvious from the following description taken in conjunction with the accompanying drawings, in which:

Figure 1 is a front view, in elevation, of a machine embodying one form of the invention;

Fig. 1a is a partial enlarged view in section taken on line Ia—Ia of Fig. 1;

Fig. 2 is an enlarged view of the machine in side elevation, as seen from right to left in Fig. 1, with the pin feeding mechanism removed;

Fig. 3 is a partial view in side elevation of a system of levers embodied in the machine of Fig. 2;

Fig. 4a is an enlarged partial view of a magazine embodied in the machine of Fig. 1;

Fig. 5 is an enlarged, partially fragmentary view in front elevation of the staple forming and stapling mechanism embodied in the machine;

Fig. 6 is a view in perspective of two elements of the staple forming and stapling mechanism;

Fig. 7 is a view in section of the stapling mechanism taken on line VII—VII of Fig. 5;

Fig. 8 is a fragmentary view in perspective of a cam operated system of levers that operate the stapling mechanism shown in Figs. 5, 6 and 7;

Fig. 9 is an enlarged fragmentary view in front elevation of a device for feeding predetermined lengths of wire stock to the staple forming and stapling mechanism, from which the staples are formed, and of mechanism for operating the tag cutter;

Fig. 10 is a view in section taken on line X—X of Fig. 9 showing in detail the elements which control the gripping and release functions of the stock gripper embodied in the staple-stock feeding mechanism;

Figure 26:
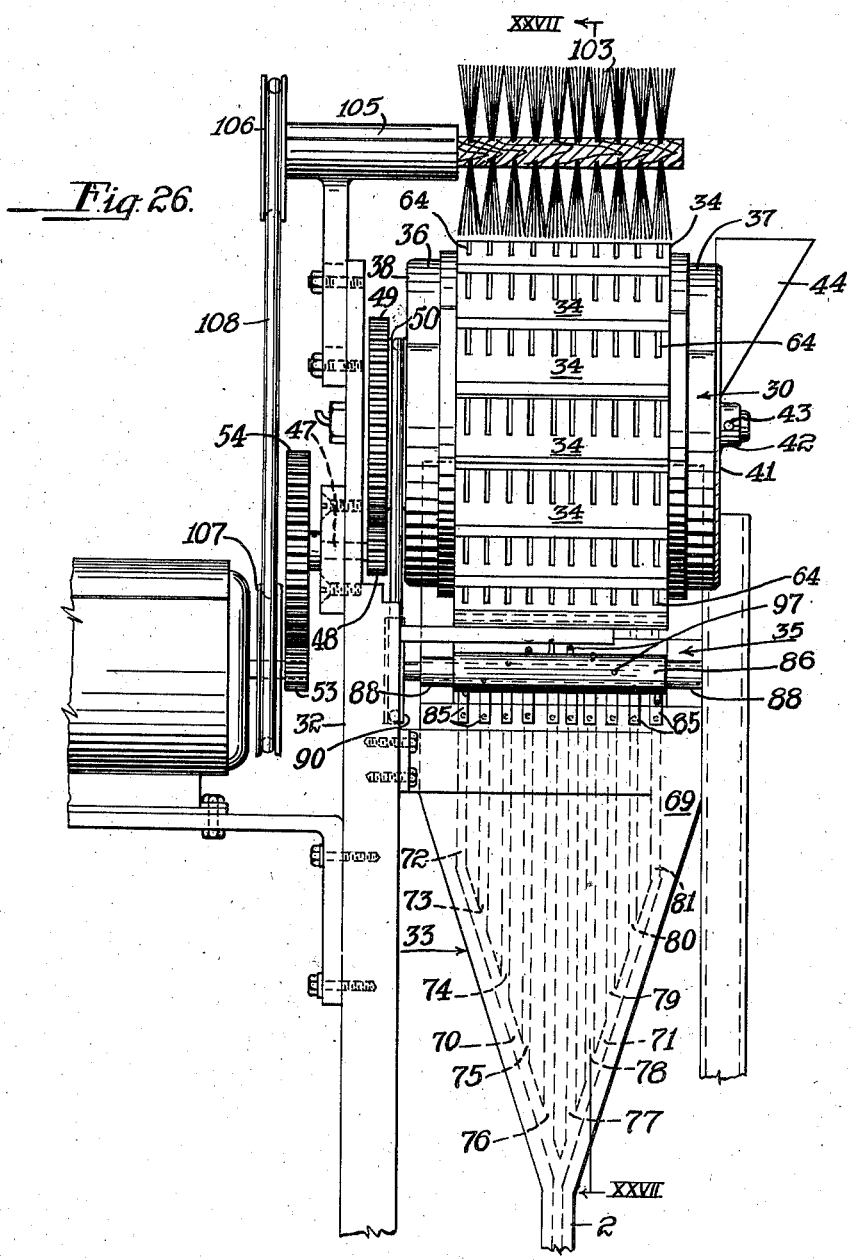

Figs. 11 to 13, inclusive, 14 to 16, inclusive, and 17 to 19, inclusive, are fragmentary views in front elevation, top plan, and side elevation, respectively, showing pictorially the sequence of operation of various mechanisms of the machine involved in the folding of an end of a piece of tag material around the back bar of a safety pin, and stapling such folded material;

Fig. 20 is a view in side elevation showing an element of the machine in the operation of withdrawing a stapled tag and pin from the machine and simultaneously folding the tag stock;

Fig. 21 is a top plan view of a finished tag;

Fig. 22 is an enlarged fragmentary view in side elevation of the tag folding, feeding and withdrawing device illustrated in connection with Figs. 15, 16, 18, 19 and 20;

Fig. 23 is a top plan view of the device shown in Fig. 22;

Fig. 24 is a view in side elevation of the device shown in Figs. 22 and 23 with the side guards removed;

Fig. 25 is a view in side elevation of one of the side guards for the device of Figs. 22, 23 and 24;

Fig. 26 is an enlarged view in rear elevation of the pin sorting and feeding mechanism shown in connection with the machine of Fig. 1; and Fig. 27 is a view in section of the pin feeding mechanism taken on line XXVII—XXVII of Fig. 26;

Throughout the drawings and the specification, like reference characters indicate like parts.

The machine illustrated in the accompanying drawings, as embodying the principle of the invention in what now appears to be, a preferred form thereof, is designed to make at a high rate of speed, marking tags such as are used in connection with the merchandising of cloth and fabric wears, in marking laundry, and various other uses. As shown in Fig. 21, the tags which this machine is designed to produce, each consists of a safety pin S. P. and a tab T. of cloth or other material, one end of which is wrapped or folded about the back bar B. B. of the pin and fastened by means of a staple S. T., preferably a wire staple.

The machine embodies a feeding device into which a quantity of pins are dumped at random without regard to orderliness of arrangement, and from which the pins are fed to a magazine one at a time and in exactly the same relative position. In the form illustrated, the pins are fed head forward with the back bars thereof all on the same side of the magazine.

From the magazine, the pins are fed one at a time in timed sequence to a landing provided in that portion of the machine where the tab material is stapled to the back bar of each pin, and discharged as a finished product.

The portion of the machine which carries on the tab-stapling function includes apparatus for folding or looping one end of the tab stock around the back bar of the pin; apparatus for feeding wire to the stapling apparatus, and cutting a length therefrom and forming a staple; and apparatus for pushing the staple through the folded end of the tab material and clinching the same. This portion of the machine also embodies means for gripping the tabbed pin and pulling it out of the machine, at the same time feeding a predetermined length of tab material, then cutting the material at a point adjacent the aforementioned landing place. After the tabbed material has been thus cut or sheared, the finished tag is discharged and the above stated cycle of operations repeated, a tabbed pin being produced each cycle.

The pin feeding, tab material feeding, and tab stapling operations are performed in timed relation by means of systems of levers and cranks which are operated by means of cams and/or springs as will be apparent as a detailed decription of the machine progresses.

Since a machine of this character is designed, in the interest of economy and low production cost, to operate at high speed, it follows that each pin must be delivered from the magazine to the landing without any loss of time the moment a finished tag has been severed from the tab stock. This is accomplished by giving the pin a high acceleration the moment it is released from the magazine. To accomplish this function the pin, when released from the magazine, is propelled by an air blast to the landing to be in position to be operated on by the stapling mechanism.

Referring now to Fig. 1 of the drawings, the machine is shown as comprising a pin feeding mechanism 1, a magazine 2 to which the pins are fed by mechanism 1, one at a time, head forward with the back bars thereof on the same side and stored head on tail, and a tag forming machine 3.

The feeding mechanism 1, magazine 2 and machine 3 are carried on a table or support 5 of such height as will provide the most convenient operating conditions for the operator. The lower end of the magazine 2 terminates in a curved portion 6 into which a continuous air blast is directed by means of a pipe 7 that is connected to a source of supply of air under pressure (not shown). Stops 8 and 8' (see Fig. 4) secured to a pivoted lever 9 operate in the lower end of the magazine at a point above the curved portion 6 to release pins one at a time into the curved portion 6, and in timed relation with the tag forming operations of machine 3.

Figure 4:
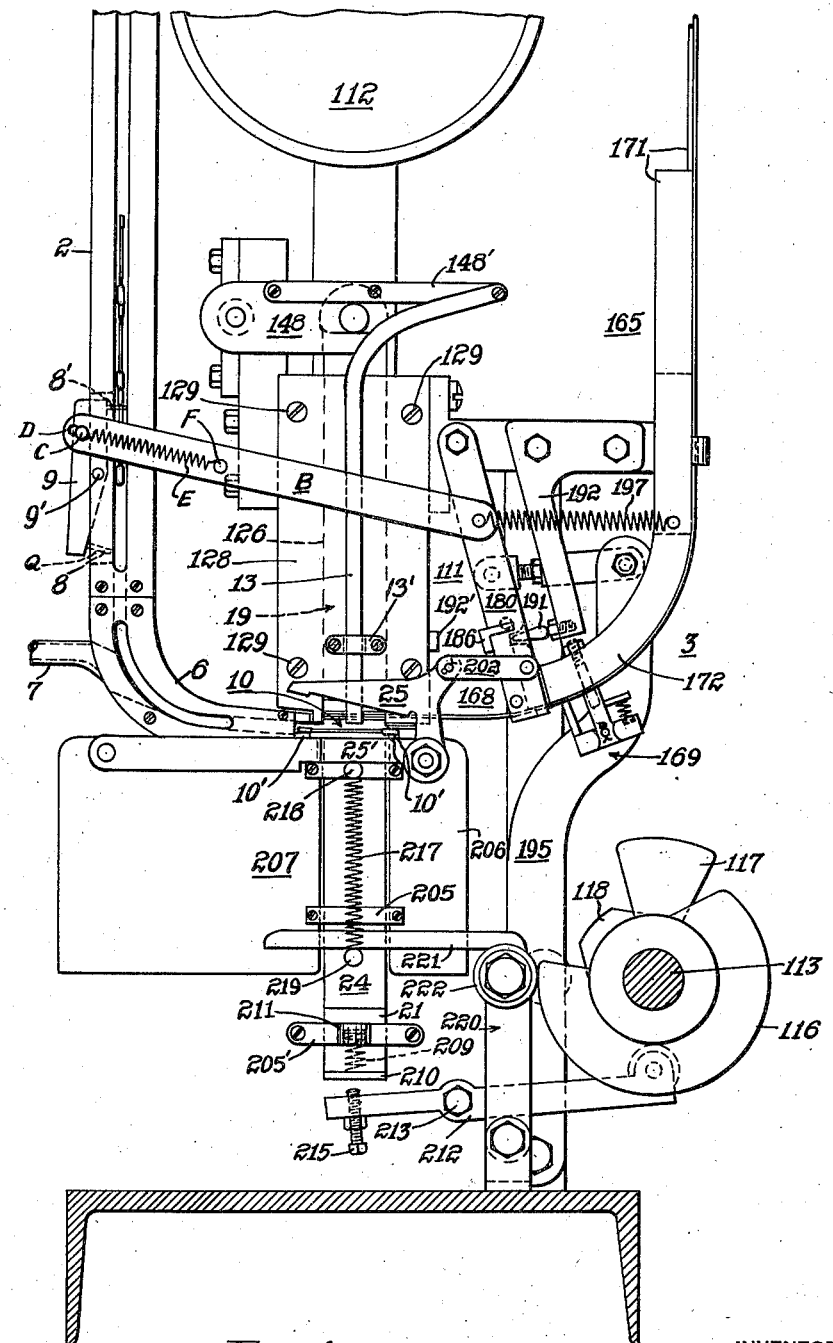
Fig. 4 is a partial enlarged front view, partly in section of the machine taken on line IV—IV of Fig. 2.

As may be seen in Fig. 4, lever 9 is pivotally mounted on a pin 9', is disposed in an opening Q located in one side of magazine 2, and carries stops 8' and 8 at its upper and lower ends, respectively. The face of the lever from which stop 8 projects is inclined outwardly so that when the lever is in its full line position, stop 8' extends into the magazine in position to support a pin thereon, the stop extending through the loop defined by the back bar and bar pin and under the tail of such pin. Therefore, when stop 8' is in this position, the column of pins above the same is also supported thereby. When lever 9 is turned to the broken line position, stop 8' releases the pin which it supports and this pin comes to rest on stop 8 which now extends into the magazine. When lever 9 is returned to its full line position, the pin which has dropped down on stop 8 is released to section 6 of the magazine and propelled by the air blast to the landing place 10. Thus as lever 9 is oscillated to its full and broken line positions, pins are dropped one at a time into portion 6 of the magazine.

Lever 9 is operated by a reach bar B one end of which is secured to the lever by a pin C that passes through an elongated slot D formed in the bar. A tension spring E connected to pin C and a pin F secured to the bar B maintains the pin C in yieldable contact with the right hand end of slot D, as seen in Fig. 4, but in case stop 8' should contact the head of a pin, the spring will yield as bar B moves and thereby avoid breaking any of the parts above mentioned. Reach bar B is connected to a system of cam operated levers which effect the above described operation of lever 9 and these cam operated levers will be described later herein.

When a pin drops into portion 6, the air blast from pipe 7 accelerates the same and almost instantly delivers it to landing 10 of the machine, where the head and tail of the pin are supported on spaced shoulders 10'. When in this position, one end of the tab stock 11 (from which tabs T are cut) which is unwound from a reel 12 at the rear of table 5, lies above the pin and is ready to be looped around the back bar (see Figs. 11, 12 and 13).

The first step in the looping operation is accomplished by an overhead vertically reciprocating plunger bar 13. When this bar moves downwardly to its lower limit of travel, it pushes the end of the tab stock through the loop in the pin (see Fig. 14) so that it is in position to be looped or folded around the back bar B. B. The looping operation is completed by a horizontally reciprocating gripping and looping device 14 (see Figs. 2, 15, 16, 18, 19, 20, 22, 23 and 24). This device includes a forwardly projecting tongue 15 and a hinged jaw 16 designed to grip the bar pin of the safety pin and loop the tab material around the back bar of the pin. Both the jaw and tongue are bifurcated to straddle the plunger bar 13 (see Figs. 14, 15 and 16). When device 14 is in its forward position as indicated in Figs. 15, 16, 18, 19 and 20, tongue 15 pushes the end of the tab under the back bar of the pin and under the body of the tab stock at the same time gripping the bar pin of the safety pin. While these functions are being performed, a wire staple S. T. has been formed by a staple-forming mechanism 19 (see Figs. 4 to 7, inclusive, and 19 and 20) so that the moment the tab stock has been folded around the back bar of the pin, the stapling and clinching of the loop is performed to secure the tab material to the pin.

When the staple has been formed, it is pushed downwardly by a plunger 20 which forms a part of the staple-forming mechanism, while at the same time a vertically reciprocating bar 21 is moving upwardly towards the looped material. The clincher bar pushes the free end of the material against the body of the tab material (see Figs. 16 and 19), and when this occurs, the plunger bar 20 pushes the prongs of the staples through the material and against the end of the clincher bar. The end of clincher bar 21 has curved grooves 22 which turn the prongs of the staple towards each other and under the tab material, thereby completing the stapling of the tab T.

The tab material having been stapled, plunger bar 20 and clincher bar 21 move away from the tab stock and device 14 moves away from landing 10 for a predetermined distance depending upon the length of tag desired. While device 14 is moving as described, a bar 24 starts moving upwardly until it engages the under side of the tab stock where it comes to rest. While at rest, a knife 25 is swung into action, cutting the tab material forwardly of the bar 24 so that the free end of the tab stock will be supported in such position by said bar that a pin fed from magazine 2 will slide under the same (see Fig. 13). When device 14 reaches the end of its rearward travel, a cam block 26 on jaw 16 strikes a roller 27, causing the jaw to move away from tongue 15 and release the tag. The cycle required to make a finished tag such as shown in Fig. 21, has now been described, and the machine is ready for another cycle, a repetition of the first. The various parts of the machine mentioned above may now be described in detail.

*Pin feeding mechanism*

The pin feeding mechanism 1 comprises a rotating drum 30 mounted on an overhanging stationary shaft 31, which is supported at one end by an upright 32 carried by the table of the machine, a guiding device 33 into which pins are discharged from drum 30, and means 35 for effecting the delivery of pins one at a time to the magazine 2.

The drum 30 comprises a series of blocks 34 which effect the delivery of pins in a definite position to the guiding device and these blocks are secured at their opposite ends to rings 36 and 37. Ring 36 is formed preferably as an integral part of a plate 38 which constitutes a closure for one end of the drum. Plate 38 is provided at its center with a relatively long hollow hub 39 through which the shaft 31 extends and constitutes the journal for the drum.

The other end of the drum 30 is closed by a plate 41 having a hub 42 through which shaft 31 extends, plate 41 having sliding contact with ring 37. A pin 43 passing through the hub and shaft holds plate 41 stationary relative to the drum. A hopper-like funnel 44 is formed at the upper portion of plate 41 having an opening therein (not shown) through which pins may be fed to the interior of the drum. The lower portion of plate 41 may be provided, if desired, with a window in order that the operator may, by observation, determine when to feed pins to the drum so that a sufficient quantity may always be maintained therein.

Drum 30 may be driven from a countershaft 47 having a pinion 48 thereon that meshes with a gear 49 loosely mounted on shaft 31 but secured to plate 38. A grooved pulley 50 interposed between gear 49 and plate 38, drives means 35 through a belt 51. A motor 52 drives the countershaft 47 through a pinion and gear connection 53, 54.

Each block 34 is provided on its inner face with a plurality of parallel rectangular recesses or slots 56 which lie in parallel vertical planes disposed at right angles to the axis of rotation of the drum. The base of each slot slopes outwardly from a point adjacent the forward or leading edge 57 of the slot towards the outer face thereof and terminates at the trailing edge 58 in an opening 59 through which the pins discharge.

As was stated previously herein, the pins are delivered to landing 10 one at a time in exactly the same relative position. For the purpose of making tags it is preferred that the pins be fed head forward with the back bar B. B. towards the machine and the bar pin facing mechanism 14. This requires, for the arrangement shown, and the direction of pin feed, that the pins shall be delivered to the magazine 2 head forward and with the thinnest portion of the head, that is, the portion to which the back bar is attached, facing the drum (see Fig. 27). To insure that each pin shall always be delivered in this manner to magazine 2, openings 59 are shaped to conform to the shape of the heads of the pins with the widest part of each opening adjacent the bottom of slots or recesses 56 and with the narrowest part thereof extending towards the inner face of the drum as disclosed in Figs. 7, 8, 10 and 11 of the aforesaid Patent No. 2,083,534. Thus, if a pin falls into any of these slots or recesses with the head towards opening 59, the pin can only pass through this opening if it is in the proper position, that is if the bar pin lies against the bottom of such slot.

In order to prevent the pins from discharging through openings 59 tail first, a lug 61 is formed on each of the walls of each slot. The space between these lugs is wider than the tail of a pin but narrower than the head thereof so that if the tail is forward, the head cannot pass between the lugs and the pin is therefore prevented from being discharged from the drum to the guiding device 33 and into magazine 2. However, when the head is forward and in that portion of a slot 56 located between an opening 59 and lugs 61 and with the bar pin against the bottom of slot 56, the pin will pass through opening 59.

The outer faces of blocks 34 are provided with grooves 64 that start at the leading edges thereof and terminate at the outer surface of the drum. These grooves are disposed in alignment with the discharge openings 59 and act as guides or chutes for directing the pins into the guiding device 33. These slots also act as elevators to carry pins which have passed through openings 59, before reaching the point of delivery to guiding device 33, to the point where such pins will discharge into the guiding device. This elevator action is accomplished by placing a curved plate 66 on the under side of the drum (see Fig. 27) and occurs when a pin is situated as at P, Fig. 27. As the drum revolves, pin P will be pushed up plate 66 by the bottom of the trailing end of groove 64 and be discharged into the guiding device 33.

In order that the supply of pins contained within the drum may be uniformly distributed so that each slot of the various blocks may deliver approximately the same number of pins to the guiding device 33, a plurality of rings 68 are mounted within the drum. It has been found by experimentation that a ring placed on every other wall defining slots 56 provides a sufficient number and efficient distribution.

The guiding device 33 comprises a vertical plate 69 having grooves or slots 70 and 71 in the front face thereof which terminate at their lower ends in open communication with the magazine 2. These slots diverge upwardly at an angle to the vertical, and have open communication with a plurality of vertical slots 72 to 81, inclusive, each disposed in alignment with a groove or slot 56 in the blocks 34 of drum 30 (see Figs. 1, 26 and 27).

The grooves or slots 70 to 81 are closed at their fronts by a transparent plate 82 which is slidably fastened to plate 69 by means of clips 83 and is supported by inclined strips 84 disposed adjacent the top of magazine 2.

Since plate 82 is transparent, the operator may observe what is going on in the grooves or slots of plate 69 so that in case these slots become obstructed with pins, the transparent plate may be lifted upwardly and the cause of such obstruction removed. This may be accomplished quickly without in any way interrupting the operation of the machine.

In order that the pins shall be delivered into magazine 2 one at a time from the grooves or slots in the plate 69, for otherwise "jamming" is likely to occur in the magazine, the means 35 previously mentioned herein is provided. Means 35 comprises a plurality of hinged or pivoted fingers 85 mounted on the rear face of plate 69, there being one finger for each slot or groove of this plate and a timing cam 86 mounted on a shaft 87 which is journalled in bearings 88 and driven from the grooved pulley 50 by a belt 51 and a pulley 90 attached to shaft 87.

Each finger 85 is provided with a pin or projection 91 at its lower end that operates in an opening 92 in the back of plate 69 and this pin extends far enough into the associated groove or slot of plate 69 to engage under the head of a pin (see Fig. 27) and thereby support a column of pins above the same in head on tail arrangement as illustrated. The upper end of each finger is provided with a projection in the form of a coiled spring 94 which normally does not engage the pins. However, when a finger 85 is turned by cam 86 in a clockwise direction, as seen from Fig. 27, the coil spring 94 of a finger moves between the tail and head of abutting pins while projection 91 moves away from the pin which it supports, allowing the same to drop into the magazine. Each finger is also provided with a cam surface 95 adapted to cooperate with cam 86. Cam 86 is provided with a plurality of projecting elements 97 mounted spirally along the cam and at spaced intervals, the spacing being the same as the spacing of fingers 85. Thus as the cam rotates, fingers 85 are operated in sequence, thereby insuring that a pin will not be released into the magazine at the same time that another pin is released to the magazine. Thus if it be assumed that there is a column of pins in each of the slots or grooves of plate 69 and disposed above a plane containing the projections 91 of fingers 85 and that cam 86 is turning in the direction of arrow 98, with the cam in the position indicated in Figs. 26 and 27, then the finger at the extreme right as seen in Fig. 26, will be actuated, then the next and so on until the finger at the extreme left is actuated. The fingers will thus be actuated in sequence from right to left as seen in Fig. 26, but never is more than one of these fingers actuated at the same time. Therefore, pins will be dropped from the grooves in plate 69 into magazine 2 one at a time in a progressive sequence, starting with groove 73 and ending with groove 81. The process then repeats itself in the same order and pins are fed to the magazine 2 one at a time as above described.

It often occurs in the operation of the drum that pins are carried upwardly too far to be discharged into the guiding device 33 and in such case these pins are often thrown on the floor or away from the machine, thereby wasting pins. In order to collect the pins that are carried too far as indicated in Fig. 27, a collecting hopper 100 is secured to plate 82 and this hopper serves as a catch-all for pins that do not fall into the slots or grooves of the guiding device. The bottom of this hopper slopes downwardly from right to left, as seen in Fig. 1, and terminates at the top of a conduit 100′ into which the overflow pins are directed and from which they discharge into a container 101. The pins collected in the container are returned from time to time to drum 30.

In the operation of drum 30, it often happens that pins are fed at a greater rate to magazine 2 than from the magazine to landing 10, and as a consequence the magazine fills up. To avoid the jamming of pins in the slots of plate 69, an opening O is provided at the top of the magazine so that the excess of pins delivered by the drum to the magazine may overflow into a chute O′ and be collected in container 101. To make certain that the excess pins shall be expelled when the magazine is full, an air blast may be played on opening O, a nozzle 110, to which a supply of compressed air may be connected, being provided for this purpose. This air blast also serves to prevent pins falling out of opening O when the magazine is not full, thus insuring sufficient delivery of pins to the magazine.

As may be seen in Fig. 27, pins have a tendency to remain in grooves or slots 56 with an end thereof projecting through an opening 59 after a block 34 has been carried past the point at which pins are normally discharged into guiding device 33. If these pins are not removed from the slots many of these slots might be rendered ineffective most of the time the machine is in operation. In order to make certain that pins shall not be lodged in the grooves of the drum block, a rotating brush 103 is provided. This brush is as long as blocks 34 and is mounted immediately above the drum for rotation on a shaft (not shown) that is journaled in a bearing 105. The brush is driven by motor 52 through a connection comprising grooved pulleys 106 and 107 and a belt 108, and in such direction that the portion of the brush contacting the drum moves in the same direction as drum 30. Thus any pins that remain in slots 56 are brushed out of the same and into the interior of drum 30. To effectively accomplish this function, the brush is driven at a higher peripheral speed than that at which the drum is driven.

Tag forming machine 3

Machine 3 comprises the previously mentioned staple forming mechanism 19; mechanism 111 for intermittently feeding predetermined lengths of wire W carried by a reel 112 (see Fig. 2) to the mechanism 19 from which lengths of wire are cut and formed into staples S. T.; device 14 also previously mentioned; and a cam shaft 113 on which a plurality of cams 115, 116, 117, 118, 119 and 120 are mounted. These cams are so shaped and positioned that the various mechanisms of machine 3 are caused to perform their functions in the proper order and in the proper time relation. The order in which the various parts of the machine function will be described subsequently herein.

The staple forming and stapling mechanism 19 is illustrated in detail in Figs. 5, 6 and 7 and comprises the previously mentioned plunger or plate 20 and a vertically moving plate 125 mounted flatwise against each other in a groove 126 formed in the front or face of a support block 127 mounted on the machine bed plate. These plates are held in place with a cover plate 128 secured to the block with screws 129. Elongated slots 130 and 130' formed in the upper portion of plates 20 and 125 accommodates a pin 131 secured to block 127 which limits the upward movement thereof, the downward movement being controlled by the throw of the cams which operate them.

The lower end of plate 125 is formed with an opening 132 of inverted U-shape, the width of which is equal to the width of the staple to be formed. The opposite vertical edges of this opening are grooved as at 133 to provide clearance for the staple wire as it is bent to form.

The back plate 20 is provided with a right angled flange 134 at its lower end that extends into opening 132 and has a running fit therewith, and the bottom face of this flange has a groove 136 through which the staple wire slides. The wire after it is cut to length is formed over a mandrel 137 which is formed as a flange at the lower end of a pivoted lever 138. Lever 138 works against a compression spring 139, there being an operative connection between them formed by means of a bolt 140 and retaining washer and nut 141 and 142, respectively. The mandrel closes the groove 136 while in the position shown in Figs. 5 and 7, but moves out of the way to the broken line position after the staple has been formed over the mandrel and just before the back bar 20 pushes the staple through the tag material.

When the front and back bars 20 and 125, and mandrel 137 are in the position shown in Figs. 5 and 7, and a length of wire is fed, the wire, which extends through a guide channel 144 in one side of the support block 127 passes through grooves 136 until the forward end strikes a stop 146 in the opposite side of block 127 or stops just short of this stop. When a length of wire is in this position, the front bar 125 starts on its downward movement, and at the beginning of this movement, a knife 147 carried by this bar cuts the wire stock so that the length required for a staple remains in groove 136. Thus as the front bar continues to move downwardly, the end portions of this length of wire which overhang the sides of mandrel 137 are bent downwardly to form a staple of inverted U-shape. When the staple has been thus formed, the back bar 20 starts downwardly and at the same time clincher bar 21 moves upwardly to the position indicated in Figs. 17 and 19. As the staple approaches stapling position, mandrel 137 is swung from beneath bar 125 so that at the end of the movement of bar 20, the staple will have been pushed through the folded tag material and clinched.

The front and back bars 125 and 20 are moved up and down in the manner above described by means of arms 148 and 149 secured to shafts 150 and 151 respectively. Shaft 151 is hollow through which shaft 150 extends and is free to turn therein. Arms 148 and 149 have elongated slots therein into which pins 152 and 153 secured to bars 125 and 20 respectively, extend and provide the necessary driving connection between them.

Plunger bar 13 which pushes the tab material through the safety pins in landing 10 is carried by and pivotally connected to an extension 148' secured to arm 148 and operates simultaneously with the front bar 125. A clip 13' secured to plate 128 serves to guide bar 13 in its vertical movements.

Shafts 150 and 151 are oscillated by means of arms 154 and 155, respectively, and cam follower or rocker arms 156 and 157 which are connected by adjustable reach rods 158 and 159. Arms 156 and 157 are each pivotally supported at their lower ends in a yoke 160 secured to the bed plate or table of the machine, and provided with cam follower rollers 161 and 162. Rollers 161 and 162 are engaged by cams 119 and 120 which are so shaped and timed that the front and back bars 125 and 20 and the plunger bar 13 are operated in the sequence or order previously described herein. The rocker arms 156 and 157 are returned by means of springs (not shown) after each staple forming operation to that position which will place the front and back bars 125 and 20 in their full line positions as illustrated in Figs. 3, 4 and 6.

*Staple wire feeding mechanism*

The staple wire feeding mechanism 111 is illustrated in Figs. 4, 9 and 10 and comprises a rigid guide member 165 which is secured to a bracket 166 fastened to block 127 with cap screws 167, an oscillating wire gripping and releasing device 168, and a friction device 169 which acts with member 165 to impose a drag or resistance to the feeding of the wire W.

Guide member 165 has a curved portion 170 disposed above the staple wire reel 112, a vertical portion 171, and a curved bottom portion 172. The wire follows the outer contour of this guide and is held in place thereon with loops 173. Friction device 169 comprises a support 174 secured to portion 172 of the guide, and an arm 175 which is secured to the support member with a bearing pin 176. Arm 175 has a finger 177 at one end thereof that engages the wire W, and a compression spring 178 is disposed between the opposite end of the arm and a lug 179, so that spring 178 at all times urges finger 177 against the wire. By adjusting the tension of this spring the drag imposed on the wire may be regulated.

The wire gripping and feeding device comprises a lever 180 which is pivotally mounted at its upper end on a bearing pin 181 secured to bracket 166, and a pivoted lever 182 having a gripping jaw 183 at its lower end. The lower end of lever 180 is provided with recess 185 of a size to accommodate lever 182. Gripping jaw 183 extends at right angles from lever 182 and under the end of the lever 180; thus when this lever is turned clockwise as seen in Figs. 4 and 9, the wire W is gripped between the teeth of this jaw and the lower end of the lever, and when turned counterclockwise, the wire is released. The wire is gripped when lever 180 swings towards the stapling mechanism, and the length of travel of jaw 183 towards the stapling mechanism determines the length of wire fed to such mechanism.

The upper end of jaw lever 182 is provided with an angle member 186 having a beveled surface 187 that cooperates with a ball 188, which is movably disposed in a socket 189, and urged by a compression spring 190 towards the beveled surface 187. When the jaw is in gripping position, the ball engages surface 187 and prevents accidental opening of the jaw on its feeding stroke. When the feeding device is on its return stroke ball 187 bears against the top of angle 186 and prevents accidental closure of jaw 183.

In order to insure positive closing of the gripping jaw before it starts on its feeding stroke, an adjustable stop 191 is provided. This stop is threaded into a stationary support bracket 192, is tapered to a point at its outer end and positioned to extend through an opening 193 in arm 180 and engage lever 182 when lever 180 is near or at the end of its return stroke. Thus, when the return stroke is completed, the jaw is closed. By adjusting this stop, the proper gripping pressure may be applied and, also, the jaw may be adjusted to accommodate wire of different gauge.

When the wire feed arm 180 reaches the end of its feeding stroke, angle 186 strikes an abutment 192' on support block 127 causing jaw 183 to open and release the wire, and as stated above, is prevented from reclosing by ball 188 until lever 180 reaches the end of its return stroke.

The wire feeding device is actuated on its feeding stroke by a rocker arm 195. This arm is pivoted at its lower end to the table of the machine and connected at its upper end to arm 180 by an adjustable link 196. The rocker arm is swung through its feeding stroke by cam 118 and is returned by a spring 197 one end of which is secured to guide 165 and the other to a pin 198 attached to arm 180.

The knife blade 25, as previously stated herein, is operated by the wire feeder arm 180 and cuts the tab material when arm 180 reaches the end of its feeding stroke. As illustrated, knife blade 25 is provided with a crank arm 199, that is pivotally supported on a bearing pin 200, and an upwardly extending arm 201 which is connected by a link 202 to feeder arm 180. Thus on each feeding stroke of the wire fed arm 180, knife 25 is moved to cutting position.

Feeder arm 180 also operates the pin feed arm 9 which controls the release of pins to landing 10, arm 9 being connected thereto by link B. A pin S. P. is released from pin 8 to landing 10 with each return stroke of feeder arm 180, and a pin is released from pin 8' to pin 8 of arm 9 with each forward or feeding stroke thereof.

Thus, it will be observed from the above, that after a staple has been formed and punched through the tab material and the staple mechanism has been returned to the position indicated in Figs. 4, 5 and 7, the operations of feeding a length of staple wire into the stapling mechanism, the cutting of the tab material by knife 25, and the release of a pin S. P. from pin 8' to pin 8 are performed simultaneously on and during the forward stroke of arm 180, but the delivery of a pin S. P. to landing 10 occurs on the return stroke of the feeder arm 180, and that all these operations are controlled by a single cam, i. e., cam 118.

It is of course apparent that before a stapled tag can be severed from the tab stock, the pin to which the material is secured must be removed from landing 10 by mechanism 14 and at the same time feed such a length of tab material that a finished tag will have a tab of the desired length.

For this reason, the staple wire feeding, tab cutting and safety pin release operations above described are delayed for a predetermined length of time after the stapling operation has been performed so that the tabbed pin may be removed as above described.

It is also apparent that before the tab material is cut and a pin S. P. is fed to landing 10, plunger 24 must be moved up to a position where the free end of the tab material is lifted above the path of travel of a pin S. P. about to arrive at the landing and at the same time provide a track on which the pin may slide into position As may be seen in Fig. 3, a pin S. P. when in the landing is supported at its opposite ends on the spaced shoulders 10' thereof so that there will be no obstruction in the path of the plunger 13 when it moves down to push the end of the tab material through the space between the back bar and bar pin of the safety pin. To accomplish these functions plunger 24 is provided with an angle member 24' on its inner or back side and so positioned that when plunger 24 is in its upper position as shown in Fig. 13, the base of this angle is in line with shoulder 10'. When plunger 24 is in this position, its upper end engages the tab material at point behind shear or knife blade 25. Thus, when the tab material is cut and the wire feed arm 180 is on its return stroke, a pin S. P. is released and propelled into the landing, being guided onto shoulders 10' by the angle member 24' and under the tab material which is held in elevated position by plunger 24. As soon as the pin has landed on shoulders 10', the plunger 24 and guide 24' move downwardly so as to be out of the path of plunger 13 when it comes down to push the free end of the tab material through the space between the back and front bars of the safety S. P. and out of the path of mechanism 14 which completes the folding of the tab material around the back bar of the pin.

Plunger 24 and the clincher bar 21 are slidably disposed one on the other (see Figs. 4, 5 and 7) on a stationary vertical plate 204, being held against the same by a guide and retaining straps 205 and 205' and the stationary knife blade 25' secured to plates 206 and 207 disposed on opposite sides of the plunger and clincher bars.

The clincher bar 21 is urged downwardly by a compression spring 209 disposed between a flange 210 thereon and a socket 211 formed in lowermost strap 205'. The clincher bar 21 is moved upwardly by a lever 212 which is supported on a pin bearing 213. This lever is rocked by cam 117 that engages a roller 214 on the lever. An adjustment screw 215 on lever 212 is provided for regulating the length of upward stroke of the clincher bar.

Plunger 24 is normally urged upwardly to operative position by a tension spring 217, one end of which is attached to a stationary pin 218 carried by knife blade 25', the lower end being connected to a pin 219 secured to the plunger.

A bell crank 220 having its horizontal arm 221 bearing on top of pin 219 controls the movement of plunger 24, and the bell crank is rocked by cam 116 which coacts with a roller 222 on the crank.

When the bell crank 220 swings in a clockwise direction, spring 217 pulls the plunger upwardly and when it is turned counterclockwise by cam 116, the plunger is returned by the crank. Cam 116 is so shaped and timed that plunger 24 and guide 24' are moved to and from the tab material supporting and pin guiding positions in timed relation with operations of cutting the tab material, the feeding of pins to the landing and the folding of the material around the back bar of the pin.

Device 14 comprises the jaw 16 which is pivotally supported on a bearing pin 225, a support arm 226 to the forward end of which the looping tongue 15 is secured. The forward end of the jaw is bifurcated to provide jaw fingers 16', and these jaws are formed with notches 16" and 16" at their lower edges. The tongue 15 is also bifurcated to form prongs 15' and these underlie the prongs of the jaw. The width of the space between the prongs of the jaw and the tongue is such that the plunger bar 13 may move between them on its downward stroke to push the cloth through the safety pin.

The bearing pin 225 of jaw 16 is supported by brackets 227 and 228 secured to support arm 226, these brackets have forwardly extending fingers 229 and 230 respectively, which are spaced from the sides of tongue 15 and jaw 16 and are provided with notches 231. The rear shoulders 232 of these notches prevent the possibility of jaw 16 over reaching the back bar of a pin S. P.

The jaw support arm 226 is mounted on two pivoted support members 233 and 234, the rear end of the same being connected to the upper end of member 234. Support member 233 is of L-shape and the support arm 226 is connected by a pin bearing 235 to the toe of this member. Portion 236 of member 233 is of channel shape in transverse section and the support arm operates between the sides of the channel (see Fig. 3).

The lever end of support 233 is provided with a rearwardly extending arm 238 having a button 239 thereon which is engaged by a bar 240 extending crosswise of the arm. One end of bar 240 is hinged at 241 and provided with a roller 242 at the other end that engages cam 115. Cam 115 and bar 240 effect the return movement of device 14 but the forward movement is effected by a tension spring 243. This spring is attached to a lug 244 secured to support 233 and to support arm 226 near its rear end. Thus when the high portion of the cam 115 leaves roller 242, spring 243 contracts and pulls arm 226 forward and as it moves forward, support members 233 and 234 turn in a clockwise direction as seen in Figs. 2 and 3. The end of this forward movement is limited by an adjustment screw 246. When support arm 226 approaches the end of its forward movement, tongue 15 moves under a pin S. P. and pushes the free end of the tab material under the back bar of the pin, and jaw 16 snaps over the bar pin. Device 14 remains in this position until a staple is pushed through the looped or folded part of the tab material, after which the high part of cam 115 engages roller 242 and returns device 14 to the position shown in Fig. 2 and the full line position of Fig. 3. As device 14 returns, tab material 11 is pulled through the landing of the machine. When block 26 of jaw 16 strikes roller 27, the jaw is opened and the pin released, and at this time, the material is cut by knife blade 25.

Roller 27 is journalled in a support arm 248 and this in turn is secured to an upright 249. Arm 248 is provided with an elongated slot 250 so that the arm may be shifted to adjust the position of the roller to that position that will give the desired length of tag. The length of the tag may be adjusted in this manner because the time at which jaw 16 opens may be varied with the position of roller 27, and this of course determines the length of tab material that is pulled through landing 10 of the machine.

From the above description of the various parts of the machine, it will be apparent that all motions are effected by the cams on the cam shaft 113 acting through a system of levers, cranks and springs. The crank shaft is driven by a drive including a motor 251, a belt 252, connected to a clutch pulley 253, and a speed reducer 254. As illustrated, a separate motor 52 drives cam shaft 88 and the feeder drum 30 but it will be understood that cam shafts 88 and 113 and drum 30 may be driven by a single motor.

Having thus described a machine which now appears to represent a preferred embodiment of the invention, it is to be understood that various modifications and changes may be made therein without departing either from the spirit, scope or principle of the invention. It is desired therefore that only such limitations shall be placed on the invention as are imposed by the prior art and the appended claims.

What I claim as new and desire to secure by Letters Patent is:—

1. A machine for making pin-on tags comprising a landing having one end of a strip of tab material positioned thereover, means for feeding pins to said landing one at a time, means for folding the end of said tab material around a portion of said pin, means for securing the folded material to a pin, means for pulling the pin with the material secured thereto out of said landing to advance said tab material through the same, and means for severing the pin-on tag from said material and leaving the severed end of said strip over said landing.

2. A machine for making pin-on tags comprising a landing on which one end of a strip of tab material may be placed, means for feeding pins one at a time to said landing, means for folding the end of said material around a portion of the pin, means for stapling said folded portion of tab material to secure the same to the pin, means for pulling the pin out of the landing and simultaneously advancing tab material through said landing, and means for severing said tab material in advance of the landing so that an end thereof remains in position to be folded around the next succeeding pin delivered to the landing.

3. A machine for making pin-on tags comprising a magazine having a supply of pins therein arranged to be discharged therefrom one at a time, and a supply of tab material to be secured to the pin, said machine having a landing, means for releasing pins one at a time to said landing, means including a plunger for partially looping one end of the tab material around a portion of the pin, means for completing the looping of the material, means for stapling the looped material to secure the same to the pin, means for withdrawing the pin from the landing and simultaneously advancing tab material through the landing, and means for severing the tab material at such point that the severed end of the tab stock extends across the landing in position to be looped about a portion of the next pin delivered to the landing.

4. A machine for making pin-on tags and having a landing to which safety pins are intermittently fed one at a time, and in which landing the end of a supply strip of tab material has initially been positioned, means including a plunger which is operatively timed to push the end of said material through the loop of the pin, means for folding said end of material to loop one bar of the pin, means for stapling said looped portion of tab material, means for gripping the pin, pulling it out of the landing and simultaneously feeding a length of tab stock, and means for severing the tab stock at such a point that an end of said stock is in position to be pushed through the loop of the next pin delivered to said landing.

5. A machine for making pin-on tags comprising a landing having spaced supports on which the ends of a pin may rest, and to which landing the end of a continuous strip of tab stock has initially been positioned, a retractable guide for guiding a pin upon said supports and raising the end of said material, means for delivering a pin to said landing and under said material while the guide is in guiding position and the material is in elevated position, means for retracting said guide after the delivery of a pin to the landing, means for looping the end of said tab stock about a portion of the pin, means for stapling said looped portion to secure the pin to the tab stock, means for withdrawing the pin and simultaneously advancing a length of material through the landing, means for moving said guide to guiding position and elevating the tab stock, and means for severing the tab stock while in elevated position.

6. A machine according to claim 1 in which the means for pulling the pin out of and advancing the tab material through the landing comprises a jaw mounted for movement towards and from the landing and designed to grip the pin when it reaches the landing, said jaw having a tongue for partially looping the tab material around the pin, and means for opening the jaw to release the pin when the jaw has moved a predetermined distance away from said landing.

7. A machine according to claim 2 in which the means for pulling the pin out of and advancing tab material through the landing comprises a jaw mounted for movement towards and from the landing and arranged to automatically grip the pin when it reaches the landing, said jaw having an extended tongue disposed to perform part of the looping of the tab material around the pin, and means for releasing the jaw from the pin when the jaw has traveled a predetermined distance away from said landing.

8. A machine for making pin-on tags comprising a landing on which one end of a strip of tab material is adapted to be positioned, means for feeding safety pins one at a time to said landing and underneath the end of said tab material, means for folding the end of said tab material around the back bar of said pin, means for securing the folded portion of said tab material to said pin, means for withdrawing said folding means to pull the pin away from said landing and simultaneously advancing the tab material over said landing, and means for severing said tab material to separate the tag from said material.

9. A machine for making pin-on tags comprising a landing on which one end of a strip of tab material is adapted to be positioned, means for feeding safety pins one at a time to said landing, means for elevating the end of said material and guiding said pins onto said landing, means for folding the end of said material around the back bar of said pin and for gripping said pin, means for shaping a piece of wire and for pushing said shaped wire through the folded material and clinching the ends of said wire to secure the material to the pin, means for retracting said folding and gripping means to pull the pin away from the landing and simultaneously advance the tab material over said landing, and means for severing the pin-on tag from said material and leaving the severed end of said strip over said landing.

10. A machine for making pin-on tags comprising a landing on which one end of a strip of tab material is adapted to be positioned, means for feeding safety pins one at a time to said landing, means for elevating the end of said tab material and guiding the pin onto said landing, means for folding the end of said material around the back bar of the pin on said landing and for gripping and holding said pin, means for securing the folded material to said pin, means for retracting said folding and gripping means to pull the pin away from the landing and simultaneously advance the tab material over said landing, and means for severing the tab material at such point that the severed end of the tab material extends across the landing.

11. A machine for making pin-on tags comprising a landing on which one end of a strip of tab material is adapted to be positioned, means for feeding safety pins one at a time to said landing and underneath the end of said tab material, means for pushing the end of the tab material between the bars of said pin, means for completing the looping of the material around the back bar and for gripping and holding the looped material therearound, means for stapling said looped material to the back bar of said pin, means for retracting said loop completing and holding means to withdraw the pin therefrom and pull a length of tab material over said landing, and means for severing said tab material at such point that the severed end of the tab material extends across the landing.

FRANK MAGIDSON.